US005667194A

United States Patent [19]

Barron

[11] Patent Number: 5,667,194

[45] Date of Patent: Sep. 16, 1997

[54] ARMATURE NEEDLE VALVE ASSEMBLY HAVING PLASTIC CONNECTING MEANS

[75] Inventor: Richard Barron, Williamsburg, Va.

[73] Assignee: Siemens Automotive Corporation, Auburn Hills, Mich.

[21] Appl. No.: 569,951

[22] Filed: Dec. 11, 1995

[51] Int. Cl.[6] .............................................. F16K 31/02

[52] U.S. Cl. ...................... 251/129.01; 251/903; 335/270

[58] Field of Search ........................ 251/129.01, 129.15, 251/903, 129.21; 137/903; 335/255, 262, 270

[56] References Cited

U.S. PATENT DOCUMENTS 4,530,486 7/1985 Rusnak ........................ 251/129.15 X

FOREIGN PATENT DOCUMENTS 46-33461 9/1971 Japan ................................ 251/129.21

778194 7/1957 United Kingdom .............. 251/129.21

*Primary Examiner*—Kevin Lee

*Attorney, Agent, or Firm*—Russel C. Wells

[57] ABSTRACT

A armature needle valve assembly for a gasoline fuel injector comprises a needle for contacting and separating from a valve seat. An armature, movable in a first direction and a second direction, causes the needle to contact and separate from the valve seat. A molded plastic connecting means secures the armature to the needle.

3 Claims, 1 Drawing Sheet

ARMATURE NEEDLE VALVE ASSEMBLY HAVING PLASTIC CONNECTING MEANS

FIELD OF THE INVENTION

The present invention relates generally to fuel injectors of the type that are used to inject liquid fuel into the induction system of an internal combustion engine and, more particularly, to the armature needle valve assembly of a gasoline fuel injector.

BACKGROUND OF THE INVENTION

Typically, a fuel injector comprises an armature, including a needle valve, movable between a first and second position for causing the needle valve to contact and separate from a valve seat. The extremes of these first and second positions are often defined by mechanical stops. The armature is moved in one direction by an electromagnetic force generated by a coil of wire and reciprocally moved in the opposite direction by a return spring. When the armature needle valve impacts a stop, it bounces.

In high speed fuel injectors, each bounce of the needle valve meters a small uncontrolled amount of fuel into the engine, to the detriment of emissions. As can be appreciated, the leakage of fuel into the engine will also result in very unfavorable fuel economy. At either end of its motion, the armature has kinetic energy as a result of its mass and velocity. With no means for dissipating that energy, it is returned to the armature by the elastic collision with the stop. Eventually, the energy is dissipated after a series of collisions and bounces. The bounce of the armature needle valve affects the operation of a fuel injector by prolonging or shortening the duration of injection and causing excessive wear in the valve seat area. This bouncing causes increased injection time and increased injected fuel quantity, thereby reducing the precision of fuel quantity, fuel delivery and poor atomization.

The armature needle valve of a gasoline fuel injector contributes to the control of the metering of gasoline in an automotive engine. Typically the armature needle valve assembly is manufactured of two materials that perform different functions. The first is the armature, that is made of a magnetic material such as stainless steel. When introduced into the magnetic circuit, the armature moves until it strikes the stator, thus unseating the needle valve causing the flow of fuel to begin. The second component is the needle valve which is typically made from a stainless steel material and is swaged to the armature. The needle valve has a radius ground on the tip which seats in a cone shaped valve seat, thus sealing the flow of gasoline until actuation of the magnetic circuit causes it to lift, initiating the flow of fuel. This assembly will be exercised in excess of a billion cycles during its life. The speed with which the assembly lifts is significant, as the timing of the fuel injection event is important to the timing of the engine. The speed is dependent on a number of technical parameters, one of which is the weight of the assembly. Directionally, the lighter the better.

It is seen then that there exists a need for an improved armature needle valve assembly which overcomes the problems associated with prior art armature needle valve assemblies.

SUMMARY OF THE INVENTION

This need is met by the present invention, wherein a method is disclosed for attaching the magnetic armature to the needle valve. The present invention offers a number of advantages over the conventional designs currently available, including a significant improvement in the weight of the assembly.

In accordance with one aspect of the present invention, a armature needle valve assembly for a gasoline fuel injector comprises a needle valve for contacting and separating from a valve seat. An armature, reciprocally movable in a first direction and a second direction, causes the needle valve to contact and separate from the valve seat. A plastic connecting means secures the armature to the needle.

For a full understanding of the nature and objects of the present invention, reference may be had to the following detailed description taken in conjunction with the accompanying drawings and the appended claims.

DESCRIPTION OF THE PREFERRED EMBODIMENT

Figure 1:
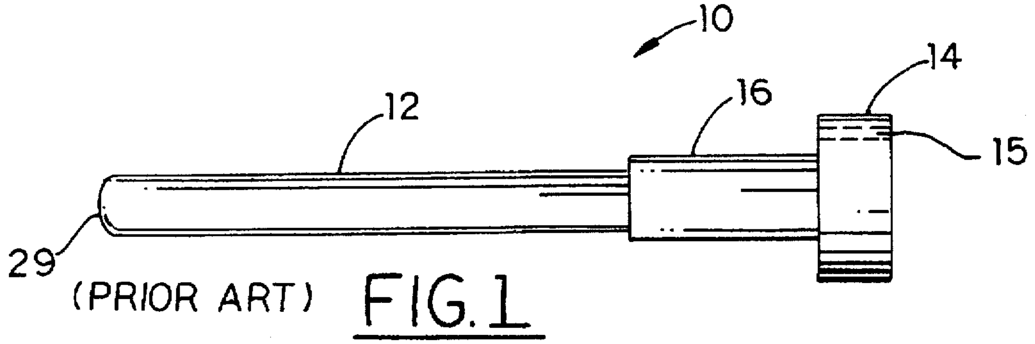
FIG. 1 is a longitudinal view of a conventional prior art armature needle valve assembly.
Figure 2:
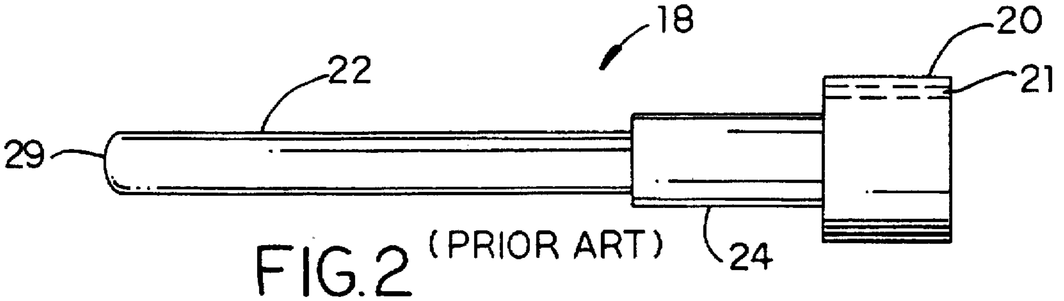
FIG. 2 is a longitudinal view of another prior art armature needle valve assembly having improved linearity, notable by the increased length of the armature.

Referring to the drawings, FIG. 1 illustrates a conventional prior art armature needle valve assembly 10, comprising a needle 12 and an armature 14. The needle 12 is swaged to the armature 14 by any conventional means, such as by inserting the needle 12 into the reduced diameter portion 16 of armature 14, and then crimping portion 16 to secure the needle 12. FIG. 2 is a another prior art armature needle valve assembly 18 having improved linearity, notable by the increased axial length of armature 20. Armature 20 is again secured to needle 22 at reduced diameter portion 24 of the armature 20.

Figure 3:
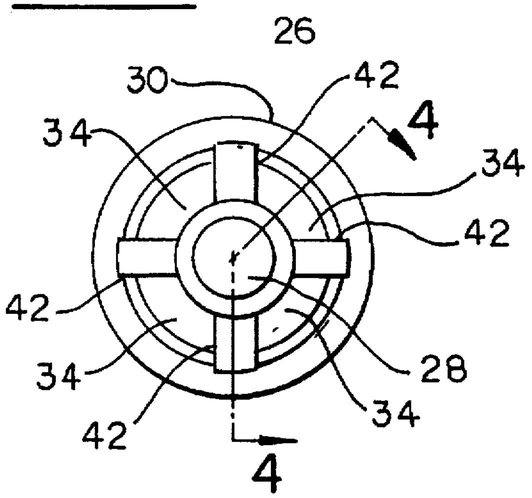
FIG. 3 is an end view of a armature needle valve assembly constructed in accordance with the present invention.

Referring now to FIG. 3, there is an unitary armature needle valve assembly 26, constructed in accordance with the present invention. In FIG. 3, there is a three piece construction to the armature needle valve assembly 26. The needle 28 is attached to the magnetic armature 30 using a plastic connecting means 32. In the preferred embodiment of the present invention, the plastic connecting means 32 is formed from a molded poly-phenylene sulfide (also known as Ryton™ or PPS) to secure the armature 30 to the needle 28. As can be seen in FIG. 3, the plastic connecting means 32 preferably tapers in diameter from the armature 30 to the needle 28. The armature 30 and the needle 28 are very similar in size to the armature 14 and needle 12 of FIG. 1. Typically the needle is formed from 440 stainless steel that becomes slightly magnetic due to heat treating the stainless steel to make it hard. The armature is 430 stainless steel and is magnetic.

The technique of the present invention for joining the armature 30 and the needle 28 offers a number of advantages over the armature needle valve assemblies 10 and 18 of FIGS. 1 and 2. For example, the weight of a conventional armature needle valve assembly, such as is illustrated in FIG. 1, is approximately 1.70 grams; the weight of an "improved linearity" armature needle valve assembly, such as is illustrated in FIG. 2, is approximately 1.86 grams; and the weight of the armature needle valve assembly constructed according to the present invention, incorporating the plastic connecting means 32, as is illustrated in FIG. 3, is only approximately 1.23 grams, which being lighter offers a significant improvement to opening time speed of the injector in which it is used.

In prior art armature needle valve assemblies 10 and 18, fuel passages 15 and 21 must be machined into the armatures 14 and 20. In performing this operation small burrs are generated which, during the life of the injector, separate and fall into the seat of the injector, causing the injector to leak. Extra care in manufacturing, along with additional processes, are required to remove the burrs. With the plastic connecting means 32 molding the armature 30 and the needle 28 together according to the present invention, the fuel passages 34 are molded into the plastic connecting means 32 thereby eliminating potential contaminates.

Since an armature needle valve assembly 26 will cycle billions of times during its life, a cycle being defined as preset stroke travel with the tip 29 of the needle 28 or the armature impact face 36 striking a valve seat or a metal stop, such as a stator, it is important that the stroke travel not get longer or shorter during cycling. To achieve this, the plastic connecting means 32 fills a retention groove on the inner diameter of the armature, and the plastic connection means flows into the existing conventional grooves 38 on the needle 28. The retention groove, not shown, is similar to a keyway on the inner diameter of the armature 30. This gives the plastic connection means 32 an area to grip the needle 28 and the armature 30 to form an unitary structure. The plastic also fills a ledge 40 of the armature 30, which adds to its rigidity. The ledge may be formed by counter boring the armature In a armature needle valve assembly, the impact face 36 of the armature 30 serves two purposes. The first is as an impact face distributing the impact load; and the second is as a surface in the magnetic circuit. The impact face 36 FIG. 3 retains both of these features, as it was not reduced in size from the corresponding impact faces in FIGS. 1 and 2.

The armature needle valve assembly 26, according to the present invention, offers an elimination of several manufacturing processes. One, the current armature needle valve assembly 10 or 18 must have the armature ground before plating, whereas the armature needle valve assembly 26 can use a non-ground armature 28, reducing cost. Also, the current armature needle valve assembly has the assembly chrome plated, necessitating an expensive masking operation. The armature needle valve 26 can have the armature 30 plated as a component, again reducing cost. Additionally, the current design 10 or 18 has an extended tip 16 or 24 on the armature 14 or 20 for swaging, which must be machined from bar stock, requiring material and cycle time on the screw machine. The plastic connection means 32 reduces the material for the extended tip 16 or 24 by 100% and also reduces the manufacturing cycle time of the screw machines.

Figure 4:
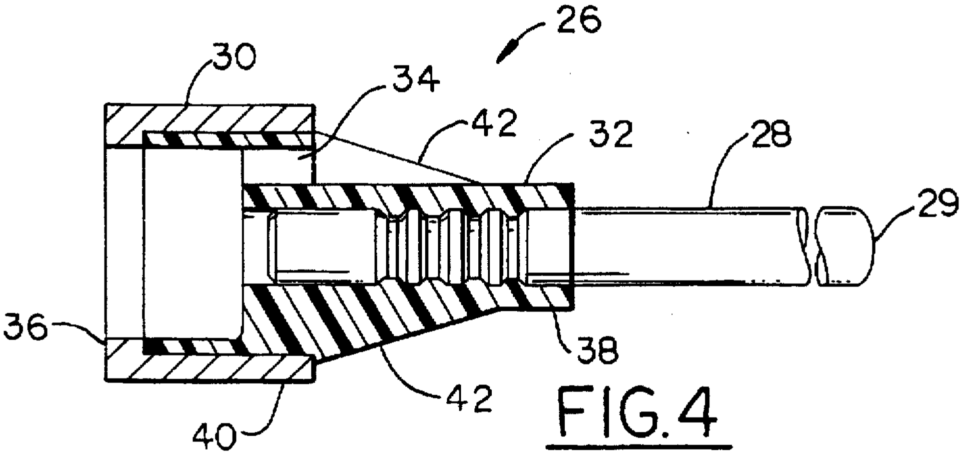
FIG. 4 is a sectional view along line 4—4 of FIG. 3.

The rigidity of the plastic armature needle valve assembly 26 is focused around four support gussets 42 that support the impact load. The gussets 42 are molded at the same time the plastic connection means secures the armature 30 to the needle 28. In addition at least one passageway 34 is molded in place to provide a passageway through the armature 30 and the plastic connecting means 32 for the flow of fuel. In FIGS. 3 and 4, there are illustrated more than one passageways. The gussets 42 insure that the impact faces strike the armature needle valve squarely, eliminating any caming action by the impact faces. Finally, needle "bounce" on opening events and closing events can be reduced by the plastic connecting means 32 functioning as an absorption means or damping means.

It will be obvious to those skilled in the art that the technique of the present invention can be applied to many existing injectors, and is not limited in application to those armature needle valve assemblies illustrated herein.

Having described the invention in detail and by reference to the preferred embodiment thereof, it will be apparent that other modifications and variations are possible without departing from the scope of the invention defined in the appended claims.

What is claimed is:

1. An armature needle valve assembly for a solenoid operated fuel injector valve comprising:

a needle for contacting and separating from a valve seat;

an armature movable in a first direction and a second direction for causing said needle to contact and separate from the valve seat; and a plastic connecting means comprising polyphenylene sulfide for securing the armature to the needle;

said plastic connecting means tapering in diameter from the armature to the needle.

2. An armature needle valve for use in an electromagnetic fuel injector comprising:

a cylindrical needle member having a first end and a second end, said first end having a spherical tip and said second end having a plurality of grooves extending axially along said needle member near said second end;

a tubular armature member formed of magnetic material, said member having a ledge along its inner diameter axially extending from one end to a point intermediate said one end and a second end, said second end being an impact face;

connecting means securing said needle member to said armature member, said connecting means being a molded member of poly-phenylene sulfide material having at least one passageway extending through said armature for forming a passageway for the flow of fuel through said armature and said connecting means and said material flowing around said grooves of said needle and on the ledge of said armature forming an unitary armature needle valve.

3. An armature needle valve according to claim 2 additionally including gusset members on said connecting means extending from said one end of said armature to the a point intermediate the ends of said needle for supporting said needle member and said armature member.

* * * * *